Figure 3:
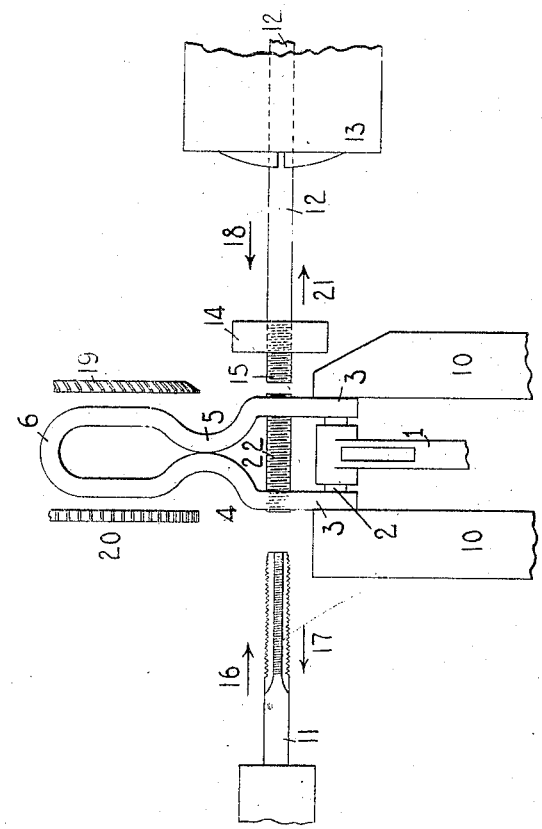

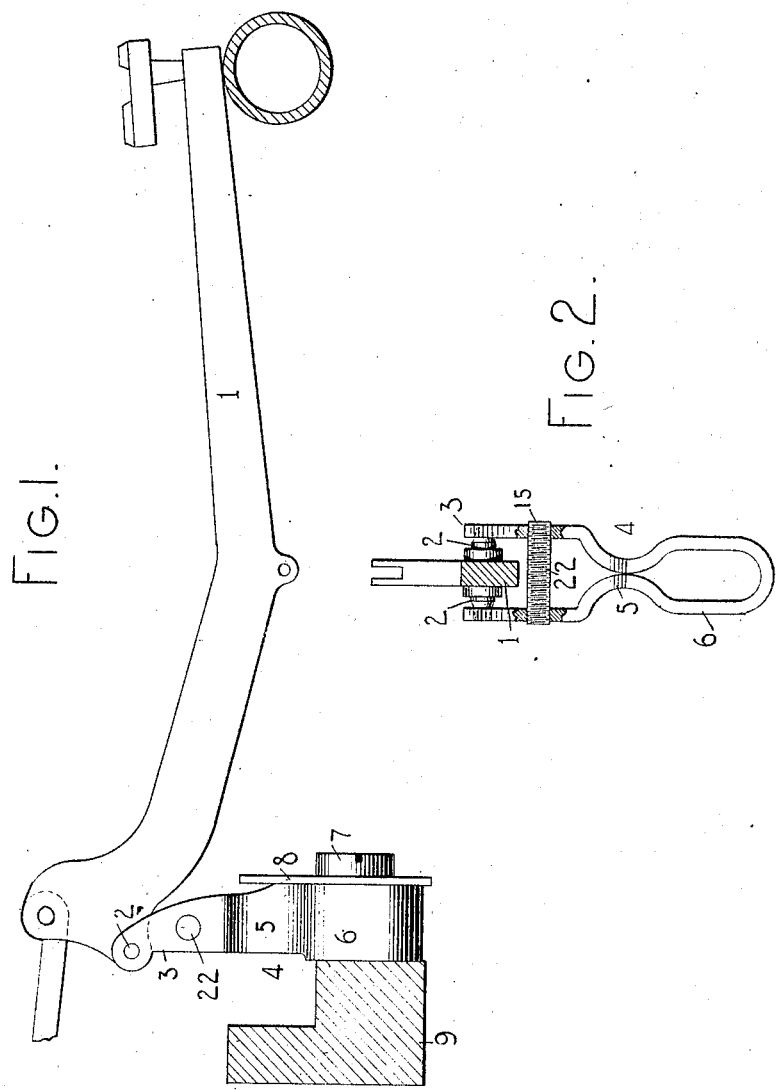

E. E. BARNEY.
TYPE WRITING MACHINE.
APPLICATION FILED JULY 3, 1909.

1,003,084.

Patented Sept. 12, 1911.

2 SHEETS—SHEET 2.

WITNESSES:

INVENTOR:
Edwin E. Barney
HIS ATTORNEY

UNITED STATES PATENT OFFICE.

EDWIN E. BARNEY, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

1,003,084.  Specification of Letters Patent.  Patented Sept. 12, 1911.

Application filed July 3, 1909. Serial No. 505,817.

*To all whom it may concern:*

Be it known that I, EDWIN E. BARNEY, citizen of the United States, and resident of Syracuse, in the county of Onondaga and State of New York, have invented certain new and useful Improvements in Type-Writing Machines, of which the following is a specification.

My invention relates to typewriting machines and more particularly to the method of and means for uniting hanger arms.

Great difficulty has been encountered heretofore in obtaining and maintaining the proper adjustment between the hanger arms of a type bar and between the bearings of the type bar. Various methods have been employed for connecting the hanger arms to retain the bearings properly adjusted, such, for instance, as ordinary rivets, shouldered rivets, combined right and left-hand screws between the hanger arms and headed screws threaded at one end into a hanger arm and headed and unthreaded at the other. The screw connections were employed primarily as adjusting means for effecting a relative adjustment between the hanger arms. All of these means, however, are open to objection and have not proved reliable. Connecting the hanger arms by rivets involves various objections. In some cases the desired adjustment between the hanger arms and the bearings could not always be obtained in the first instance, but it was necessary in order to get the best results to first unduly tighten the bearings, form the heads of the rivets and then afterward loosen up the bearing until the type bar was sufficiently free to turn easily.

Aside from the above disadvantages from the use of rivets they only provided, in some instances, for preventing the hanger arms from springing outwardly and by their use an unnecessary pressure was ordinarily exerted on the bearing faces, and in no case could the adjusted relation of the bearings be efficiently preserved. Moreover, in some instances, the heading up of the rivets tended to destroy an adjustment of the bearings formerly attained or desired. When right and left-hand screws were employed the type bar was not inserted in place until after the screw was connected and the adjustment of the bearings could be attained only through an adjustment of the screw. In constructions which employ headed screws, the adjustment of the bearings mainly depended upon the screws. Then again such screws made no provision for preventing an inward movement of the hanger arms. They provided only against the arms springing outwardly away from each other. Furthermore, in all such constructions employing screws, the screws invariably worked loose by the constant jar upon the parts in the action of the machine and by reason of the fact that the threads in such cases tended to loosen the screws or to turn each connecting screw in one direction, and this was true whether a combined right and left-hand screw or a headed screw threaded into a hanger arm at one end was employed. Turning the screws in such constructions changed the relation of the arms of the hanger and affected the bearings of the type bar.

The main object of my invention is to overcome the above and other difficulties heretofore encountered and to provide a simple and efficient method of and means for uniting hanger arms while they are maintained in adjusted relation with the type bar in place and without disturbing such adjustment and for maintaining the adjustment of the arms while the hanger is in use.

To the above and other ends which will hereinafter appear, my invention consists in the features of construction, arrangements of parts and combinations of devices to be hereinafter described and particularly pointed out in the appended claims.

In the accompanying drawings, Figure 1 is an enlarged detail side view of a type bar and hanger made in accordance with my invention. Fig. 2 is a front elevation of the same with parts sectioned away. Fig. 3 is a fragmentary view showing a machine or mechanism for carrying out the method forming the subject-matter of the present invention, the view illustrating a type bar and hanger in place in the machine and the hanger arms connected by its threaded connection.

The type bar and hanger shown in the present instance is similar to that employed in the Monarch machine, although it should be understood that various styles of type bars and bifurcated hangers may be used.

The type bar 1 is provided with trunnion-like coned pivots 2 which are received in corresponding bearing openings in the arms 3 of a sheet metal bifurcated hanger 4 formed in cross section as shown in Fig. 2 with inwardly projecting portions 5 which are brought into contact with each other and a looped portion 6 for the passage therethrough of the stem of a headed screw 7. The head of the screw bears against a washer or plate 8 interposed between the head of the screw and the front of the hanger. This screw is received at its threaded end in a tapped opening in a segment 9. In making the hangers they are preferably formed from a blank with pivoted bearings therein and holes are pierced therein which are afterward tapped for a threaded tie rod. The hanger is then formed and folded substantially as shown in the drawings with the type bar seated in the bearings between the hanger arms, the holes for the tie rod being brought into alinement. The hanger is adjusted to a "centering form" (not shown) upon a semi-automatic machine and is received between two hand operated jaws 10 (Fig. 3) of a vise-like clamp forming part of the machine. These jaws are closed over the bearing ends of the hanger so that the exact relation of the hanger arms and bearings for the type bar is provided and maintained. This adjustment of the type bar and hanger in the machine brings the openings for the tie rod into registration with a tap 11 and with a wire 12. The wire 12 is secured in a rotary chuck 13 and is adapted to pass through a fixed die 14 by which threads 15 are cut along the wire when the chuck is rotated. The operator first moves a treadle which releases the rotating tap 11 and causes it to move in the direction of the arrow 16 and to pass through the registering tie rod openings in the hanger and to tap the openings in both hanger arms at a single operation so that the threads tapped in one hanger arm are as though they were a continuation of those tapped in the other hanger arm in order that a screw, the threads of which extend in one direction, may pass through and properly co-act with the threads in both of the hanger arms without disturbing the adjustment of either hanger arm. After the tap has passed through both of the registering openings in the hanger arms the rotation of the tap is reversed and it is moved in the direction of the arrow 17 and withdrawn from the hanger. Simultaneously with the withdrawal of the tap 11 the wire 12 is rotated by the chuck 13 to pass it through the stationary thread cutting die 14 and to feed the screw threaded rod in the direction of the arrow 18, the feed of the wire being suitably timed to follow up the receding tap and to thread itself through the tapped holes in the hanger arms until the free end of the wire projects slightly beyond the left-hand wall of the hanger in Fig. 3. The wire 12 ceases to rotate at this point and during the stop motion of the wire rod two parallel saws 19 and 20 move transversely of the axis of the rod, one to sever the projecting end close to the hanger and the other to sever the threaded tie rod from the body portion of the wire as shown in Fig. 3. The saws then swing back to the position shown in Fig. 3 and the direction of rotation of the wire 12 is reversed to draw the projecting threaded end back through the threading die 14 in the direction of the arrow 21 to remove any bur caused by the saw 19. This leaves the tie rod 22 of uniform diameter throughout and also threaded for its whole length. Each end of the tie rod extends slightly beyond its associate hanger arm as shown in Figs. 2 and 3. The operator then releases the jaws 10 and removes the hanger with the type bar mounted in place and the hanger arms properly united by the tie rod. The act of threading the tie rod through the tapped openings in the hanger arms in no manner disturbs the adjustment of the hanger arms provided by an adjustment of the jaws 10. The hanger with the bearing faces in the hanger arms properly adjusted with reference to the pivot of the type bar is clamped before the threaded rod 12 is threaded into the tapped openings and this adjustment is maintained during the act of connecting the hanger arms and is not afterward disturbed, and there is no liability of a derangement of the adjustment in the subsequent use of the type bar in the typewriting machine.

Thus it will be understood that the threads of the tie rod, all extending in the same direction, cause the two arms of the hanger to act as check nuts or, in other words, each threaded opening in a hanger arm effects a checking or counterbalance on the other to prevent a rotation of the screw in its tapped openings in either direction. Otherwise stated, if one hanger arm through an outward tension tends to rotate the screw tie rod in one direction, the opposite arm, which must have the same degree of tension, tends to rotate the screw threaded tie rod in the opposite direction. It will be understood, however, that even if this headless threaded tie rod should turn in its tapped openings in the hanger arms, that would not change the relative adjustment of the hanger arms and would not affect the type bar bearings. The tie rod would simply creep longitudinally through the tapped openings but the hanger arms would still be maintained properly spaced apart. There is no necessity in this construction of upsetting the ends of the tie rod because there is no tendency for the threaded wire to turn in its tapped openings and it is not intended that the tie rod should in any manner effect an adjustment between the hanger arms, this adjustment being provided in the first instance before the tie rod is inserted in place. It is not ordinarily intended to readjust the hanger. In exceptional cases, however, where the bearing loosens up from wear and re-adjustment is necessary, the adjustment can be effected without the mutilation of the screw by removing the hanger from the machine and slightly compressing the projecting ends of the threaded tie rod between the jaws of a vise without exerting any direct pressure upon the hanger arms themselves. This will be sufficient to move the hanger arms toward each other to compensate for any wear at the bearings without loosening the connection between the hanger arms.

It will be understood that the threaded tie rod resists both inward and outward movement of the hanger arms and forms an efficient tie or connection between the hanger arms. It has been found in practice that the present construction will resist a pressure of more than twice the amount of a rivet connection between the hanger arms. Thus it may be assumed that a riveted hanger subjected to a pull of fifty pounds at the rivet will cause a loosening up of the bearing. The threaded connection of the present construction will resist a one hundred pound pressure without affording a loosening of the bearing.

What I claim as new and desire to secure by Letters Patent, is:—

1. In a typewriting machine, the combination of a type bar and a pivot, a hanger having arms under compression and properly adjusted to said pivot, and a transverse screw engaging tapped holes in said arms and operative to prevent expansion of said arms, the threads of the screw and of the openings extending in one direction only.

2. The herein described method of uniting a bifurcated hanger and a type bar having a pivot which consists in adjusting the hanger arms in their proper relation to said pivot by forcing said hanger arms toward each other, holding said arms in their adjusted positions, tapping openings in said hanger arms while thus held, and then threading a single tie-rod through said tapped openings while the said arms are still maintained under compression and in adjusted relation to the pivot.

Signed at Syracuse, in the county of Onondaga, and State of New York, this first day of July A. D. 1909.

EDWIN E. BARNEY.

Witnesses:
G. B. BRAND,
W. C. HAY.